(No Model.)

S. R. CAMPBELL & C. H. FINCH.
LAWN MOWER.

No. 338,479. Patented Mar. 23, 1886.

UNITED STATES PATENT OFFICE.

SEPTIMUS R. CAMPBELL AND CHARLES H. FINCH, OF TORONTO, ONTARIO, CANADA, ASSIGNORS OF ONE-HALF TO WILLIAM HEWITT, OF SAME PLACE.

LAWN-MOWER.

SPECIFICATION forming part of Letters Patent No. 338,479, dated March 23, 1886.

Application filed April 1, 1884. Serial No. 126,277. (No model.)

*To all whom it may concern:*

Be it known that we, SEPTIMUS ROBERT CAMPBELL and CHARLES HENRY FINCH, both subjects of the Queen of Great Britain, and both residing at Toronto, in the county of York and Province of Ontario, Canada, have invented a new and useful Improvement in Lawn-Mowers, of which the following is a specification.

Our invention relates particularly to a machine which not only cuts but rakes and rolls the grass in one operation; and it consists, first, in the peculiar construction and operation of the cutting-knives, and in the manner in which a reciprocating horizontal motion is communicated to one of them (the other being stationary) from a large drum or roll, upon which the whole weight of the machine is carried.

It consists, further, in the novel arrangement for regulating the height of cut of the knives.

It consists, lastly, in the peculiar construction and arrangement of a rake, which catches the grass as it is cut and gathers it into a bundle, which can be deposited on the ground at any time by the operator when he desires.

Figure 1:
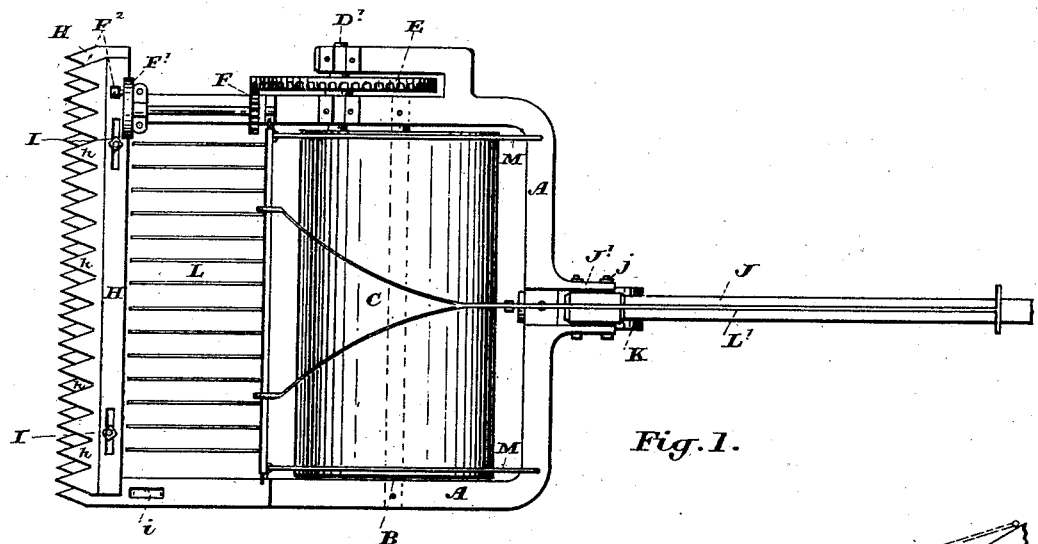
Figure 2:
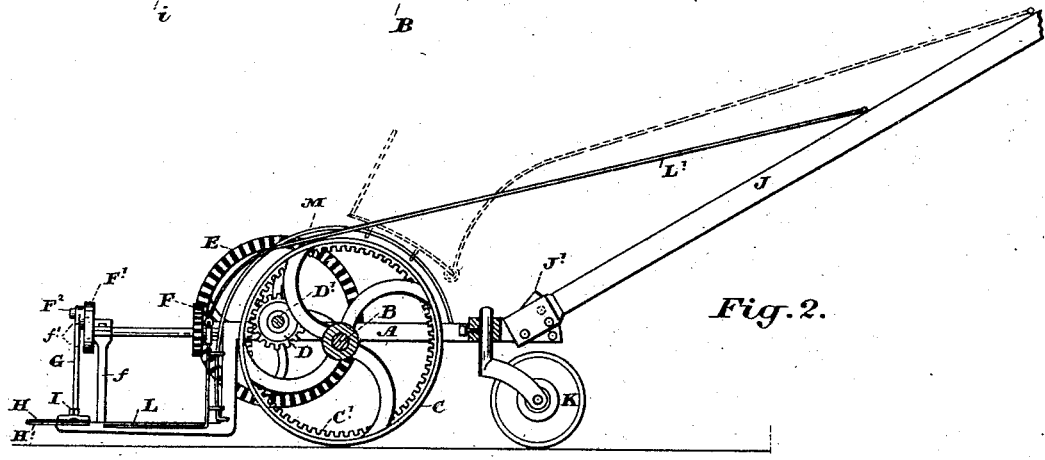
Figure 3:
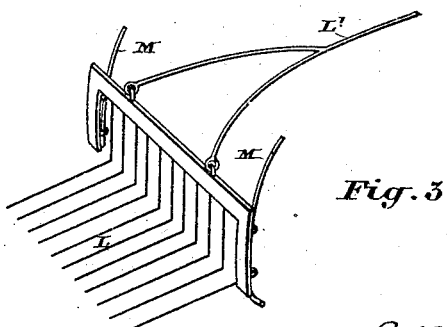

In the drawings, Figure 1 is a plan, and Fig. 2 a sectional side view, of a machine constructed according to our invention. Fig. 3 is a detail of the rake.

A is the frame of the machine, strongly constructed of metal and supported on the ends of the roller-shaft D.

C is the roller contained within the frame, cast hollow, but sufficiently heavy to roll the lawn efficiently when passed over it. On the inside of the roller, at one end, teeth C' are cast or otherwise secured round the whole circle of the roller, forming an inside-geared wheel, into which the pinion D meshes.

On the shaft D', upon which the pinion D is fastened, a large multiplying-wheel, E, is also secured, which in turn gears with a small toothed wheel, F, placed at right angles to it. The wheel F is set on a shaft, one of whose bearings is in the frame A, and the other is on a vertical standard, $f$, fixed, as will be seen, on the tongue of the said frame A. At the front end of this shaft is rigidly fixed a small wheel, F', having on its front side a projecting pin, F², set near the edge of said wheel. This pin F² works in a slot, $f'$, in the vertical crank-rod G, which is rigidly fixed upon the upper knife, H, or on the face-plate thereof, and at right angles to it, as shown, and communicates to this upper knife the reciprocating motion required. The knife H travels to and fro over a similarly-toothed stationary knife, H', fixed to the forward ends or tongues of the frame A. The upper knife, H, is retained in position by a stud-bolt and washer, I.

To the rear end of the frame A (which at this point connects the two sides) a quadrant handle-piece, J', is attached, and an enlarged thickness of the frame is made to receive the shank of the adjusting-roller K.

J is the driving-handle, attached to the frame by a pin or pins, as shown. The height of the handle may be adjusted to suit the operator by changing the pin from one to another of the graduated holes in the quadrant-piece.

L is a rake placed in front of the roller and in rear of the knives, and is shaped substantially as shown in Fig. 3. By means of eye-bolts or staples it slides on a semicircular rake-guide, M, which is attached one end to the forward part of the frame A, and the hinder part of the semicircle to the heel of the tongue of the said frame at the point $g$.

L' is a handle hinged loosely on the frame of said rake, as shown, and extending back to a point easily attainable by the hand of the operator. When in the act of dumping the cut grass, this rake assumes the position shown by the dotted lines in Fig. 2, which sufficiently explains this part of our invention. The height of the knives from the ground can readily be adjusted by means of the roller K, whose arm is adjustable in its socket by the set-screw, as shown. If preferable, a small roller may be substituted at the point marked in the tongue of the frame A by dotted lines at $i$.

We do not confine ourselves to the use of the roller C, as some persons might desire to make use of the machine as a mower only, in which case wheels might be substituted; but we direct attention to the fact that the whole weight of the machine is concentrated on the roller, giving strength and power to the machine, and from the size of the roller lessening the labor of the operator.

We claim as our invention—

1. In a lawn-mower, the combination of the front cutters, the removable rake in rear of the same, the ground-roller or traction-wheel arranged in rear of the rake, the frame, the guide-rods, and the hinged handle, substantially as and for the purpose specified.

2. The rake L and hinged handle L', in combination with the frame A, having the guides M, arranged as described, and for the purpose specified.

S. R. CAMPBELL.
CHAS. H. FINCH.

Witnesses:
W. PEACOCK,
M. WILLS.